3,423,215
VINYL RESIN COATING COMPOSITION SUITABLE FOR USE AS A COLD SET INK
Robert Frank Gerhardt, Deer Park, N.Y., assignor to American Can Company, New York, N.Y., a corporation of New Jersey
No Drawing. Filed June 17, 1965, Ser. No. 464,865
U.S. Cl. 260—30.4                9 Claims
Int. Cl. C09d 11/08; C08f 29/14

ABSTRACT OF THE DISCLOSURE

A coating composition suitable for use as a cold set ink containing a high molecular weight polyvinyl chloride dispersion resin, a lower molecular weight polyvinyl chloride solution resin, an epoxide plasticizer and an aromatic hydrocarbon vehicle for the resins which is solid at room temperature but liquid at elevated temperatures.

---

The present invention relates to a synthetic resin coating composition; and in particular it relates to a cold-set vinyl resin coating for decorating the exterior surface of a container.

For the most efficient outside decoration of formed containers made of non-absorbent material, such as metal or glass, it is desirable that the ink coatings applied to such a substrate set substantially immediately upon contact with the substrate so that superposed or adjacent decoration may be applied in rapid sequence without the offsetting or smearing of the previously applied decorative coating. Although such cold-set ink or coating compositions utilizing glass frit which is subsequently fused to the glass bottle are known to the art, such prior art cold-set coatings are economically unfeasible for use on so-called "one-way" glass bottles and are inoperative for use on containers made from metal or plastic. Also coatings for beer or soft drink bottles must resist prolonged exposure to water or a caustic aqueous environment. For example, these bottles are subjected to a hot, caustic alkaline rinse before filling; and are often immersed for hours in refrigerated water for cooling. Very few organic coating compositions have been found capable of withstanding such treatment while maintaining their hardness and/or adhesion to the glass substrate.

Further, applying a plurality of decorative coatings, one over the other, on the surface of any container made of a non-absorbent material produces a relatively thick film. When the so coated or decorated container is subsequently baked to cure or set the coating, the softening that occurs in the coating prior to final setting tends to cause the various layers to run together or sag thereby destroying the integrity of the decoration.

Among the many coating compositions formulated and tested as a decorative coating for a hard, non-absorbent substrate, only the compositions of the instant invention were found to maintain the necessary adhesion to the substrate through all the tests, to maintain their inertness and hardness and to refrain from bleeding together or sagging during the heat curing or setting operation while at the same time being relatively inexpensive and having the necessary cold-set property.

It is therefore an object of the instant invention to provide a cold-set, decorative, synthetic resin coating composition which, after application, is and remains inert and adherent to a non-absorbent substrate.

Another object is to provide a synthetic resin, cold-set ink composition which does not bleed or sag during the baking thereof after its application to a container.

Yet another object is to provide a synthetic resin, cold-set ink formulation over which subsequent decorative organic coatings can be applied in rapid sequence and the superposed plural coatings baked to a solid condition in a single operation.

Still a further object is to provide a cold-set ink formulation composed substantially entirely of organic chemical ingredients which may be applied efficiently and at sufficiently low cost to make it highly suitable for the decorating of disposable, single-use glass bottles.

Numerous other objects and advantages of the invention will be apparent as it is better understood from the following description which discloses a preferred embodiment thereof.

The above objects are accomplished by providing as a decorative or ink coating a composition containing a relatively high molecular weight polyvinyl chloride dispersion resin, a slower molecular weight polyvinyl chloride solution resin, an epoxide as a plasticizer for these resins, and a substituted or unsubstituted aromatic hydrocarbon which is solid at room temperature but liquid at elevated temperatures as a volatile vehicle for the resins and plasticizer.

The dispersion resin belongs to a well known class of vinyl chloride polymers which are relatively insoluble in relatively strong polar solvents such as ketones in which corresponding but lower molecular weight vinyl polymers are soluble. The number average molecular weight of these dispersion resins is substantially in excess of 10,000 and is usually 20,000 or higher. The resin may be composed wholly of polyvinyl chloride or may be copolymers of vinyl chloride with other polymerizable olefinic monomers in which copolymers, the combined vinyl chloride content is greater than 90%. Examples of such copolymerizable olefinic polymers are vinyl esters such as vinyl acetates, acrylonitrile and acrylic esters, such as methyl and ethyl acrylate or methylacrylate, and maleate esters such as dibutyl maleate. The amount of dispersion resin operable in the instant combination is about from 15% to 55% and preferably about 25% to 35% of the non-volatile resins in the composition.

The solution resin preferred in the instant composition is a copolymer of vinyl chloride and vinyl acetate hydrolyzed to produce in the copolymer 2 to 20% by weight of combined vinyl alcohol. This resin is disclosed and described in U.S. Patent #2,512,726. A material having excellent utility in the subject invention is one composed of 91% combined vinyl chloride, 3% combined vinyl acetate and 6% combined vinyl alcohol, and solid commercially under the trade name Vinylite VAGH or its lower molecular weight counter part VAGD. Another vinyl choride solution resin having utility in the instant invention but being much less effective to provide the desired result as the preferred hydrolyzed vinyl chloride-vinyl acetate copolymer, is an unhydrolyzed copolymer of vinyl chloride and vinyl acetate containing 85 to 95% combined vinyl chloride and 5 to 15% of vinyl acetate. A commercial resin meeting this definition and having utility in the subject invention is that sold commercially as Vinylite VYHH. An interpolymer of vinyl chloride, vinyl acetate and maleic acid or anhydride, such as that sold commercially as Vinylite VMCH, may also be used where its acid functionality does not produce undesirable side reactions such as when the plasticizer is epoxidized polybutadiene. The vinyl solution resin is present in the composition in an amount by weight of about from 5% to 35% and preferably about 25 to 30% based on the weight of non-volatile resinous ingredients.

To provide the finished solid coating with certain desirable properties such as flexibility and continuity, it is necessary to incorporate a plasticizer in the composition. Further, because of the heat sensitive nature of vinyl polymers, it is important that a thermal stabilizer be present to at least inhibit, if not obviate the tendency of the vinyl resins to heat degrade at the baking temperatures. The materials found most suitable to act both as a plasticizer and a heat stabilizer are liquid epoxide resins. A number of liquid epoxies are operable such as the well-known 1,2-epoxide resin described in U.S. Patent #2,592,560 and usually formed by reacting epichlorhydrin and dihydroxy-diphenyl-dimethyl-methane, i.e. bisphenol, in the presence of a sodium hydroxide catalyst, and an epoxidized vegetable oil, such as epoxidized soybean oil. Since it is necessary that the epoxide be liquid at room temperature, only those 1,2-epoxide resins having a number average molecular weight in the range of about from 325 to 750 and preferably about 370, and an epoxide equivalent of about from 140 to 375 and preferably about 200 are used.

However, by far preferred, since it produces a coating having the best adhesion to glass is an epoxidized polybutadiene formed by epoxidizing in solution polybutadiene having an absolute viscosity of about 1500 cps. at 100° F. with a peracid. The absolute viscosity at a given temperature of a polybutadiene is a conventional method of designating the degree of polymerization or average molecular weight of the polymer. For the purpose of the instant invention 1500 cps. at 100° F. describes the preferred polybutadiene. However, it is to be understood that polybutadienes having a somewhat higher or lower molecular weight as evidenced by a somewhat higher or lower absolute viscosity respectively may also be used.

The epoxide group is introduced into the polybutadiene chain by means of organic peracids, usually aliphatic peracids such as peracetic acid or performic acid. This reaction usually takes place in a solvent for the polybutadiene and peracid such as toluene and at elevated temperatures, e.g. about 60° C., and in the presence of a suitable catalyst such as sulphuric acid. The amount of epoxidization of the polybutadiene or quantity of oxirane oxygen introduced into the polybutadiene chain will depend upon the percentage of the stoichiometric quantity of epoxidizing peracid reacted with polybutadiene. For use in the instant invention the epoxidized polybutadiene contains from about 4% to 8% and preferably about 6% oxirane oxygen, i.e. 4 to 8 and preferably about 6 gram-mols of oxirane oxygen per 100 gram-mols of epoxidized resin. To obtain about 6% of oxirane oxygen, an amount of peracids in the order of magnitude of 50% of the stoichiometric amount is reacted with the polybutadiene.

The following is an idealized structural formula of the preferred epoxidized polybutadiene from peracetic acid and butadiene-1,4 having utility in the instant invention.

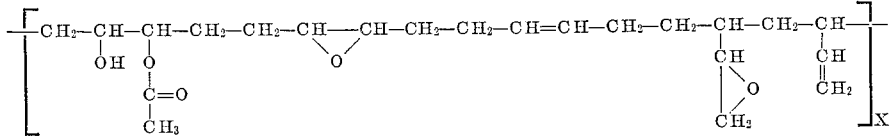

wherein X is a number whole or fractional, between 2 and 5. Although not shown in this idealized structural formula, the greatest percentage of molecules of the epoxidized polybutadiene useful in the instant invention have terminal oxirane groups.

To further improve the thermal stability, application properties, e.g. viscosity, and adhesion, it is preferred that a polymethylol phenolic resin be used in conjunction with the epoxide. This polymethylol phenolic is described and disclosed in U.S. Patent #2,579,330. Among the phenolic resins disclosed in this patent only those resins are operable in the instant invention which are soluble and fusible, i.e. A-stage, 1-alkenyl or halogenated alkenyl ethers of the polymethylol phenol. Specifically preferred in the invention is 1-allyloxy-2,4,6-trimethylol benzene. This resin is present in the liquid composition in an amount of from 2% to 6% by weight of non-volatile resins and preferably about 4%.

The aromatic hydrocarbon volatile vehicle has a definite melting point; is solid at the temperature of the surface to be coated which most usually will be the ambient temperature surrounding this surface, e.g. room temperature; has a melting point in the range of from 35° C. to 150° C.; when it is in its heated liquid state, it dissolves the vinyl solution resin and has a swelling action on the vinyl dispersion resin; and in its cooled, solid state it has little or no solvent action on either of the vinyl resins, i.e. the vinyl solution resin is, at most, in partial solid solution in the vehicle; and has an appreciable vapor pressure at the baking temperature.

The aromatic compounds meeting the above requirements and having utility in the instant invention are diphenyl, which is preferred, 4,4'-dichlorodiphenyl, para dichlorobenzene, naphthalene, and substituted naphthalene, e.g. beta chloronaphthalene and 1,4-dichloronaphthalene, acenaphthylene and acenaphthene. These substituted and unsubstituted aromatic hydrocarbons are present in the instant composition in varying amounts depending upon the melting range desired for the compositions as will be explained more fully hereinafter.

It will be noticed from the nature of the ingredients described hereinbefore that the instant composition is very similar to a vinyl organosol, differing principally in the volatile organic vehicle. It is completely unexpected that the aromatic hydrocarbon vehicle of the instant invention not only provides the necessary solvent and swelling action on the two different vinyl resins when the vehicle is in its heated liquid state, but also that the liquid composition remains stable at the elevated temperatures needed to maintain the liquidity of the vehicle. In other words, one would expect that when the ink composition is maintained at its application temperature for a prolonged period, e.g. a number of hours, gelation of this composition would occur. However, completely contrary to this expected result the heated liquid composition does not gel but maintains a substantially uniform viscosity indefinitely for reasons not understood.

The instant composition may contain optional ingredients in addition to those specified hereinbefore, which optional ingredients are to provide some specific desired result. For example, pigments may be added to the composition to provide some desired coloring effect, such as titanium dioxide for a white coating. Another optional ingredient found useful in further improving the adhesion of the composition to glass are lower alkoxy silanes. Lubricants such as polyethylene wax may also be added.

The following decorating ink compositions and the method of making and using them are by way of explanation and are not to be considered to limit the instant invention.

Example 1

Each of the ink compositions disclosed in the following examples were compounded in essentially the same manner as follows:

The polyvinyl chloride dispersion resin, pigment, silane adhesion promoter, plasticizer and heat stabilizer were placed in a high speed mixer and subjected to the mixing action thereof while at the same time permitting the heat of friction generated to raise the temperature of the mix to about 120° F. thereby causing the polyvinyl chloride to swell and producing a rough dispersion or premix. This premix was then transferred to a cold, three-roll mill and ground thereon until a smooth paste resulted. In a separate vessel the aromatic hydrocarbon vehicle and lubricant were melted together at a temperature of from 200 to 240° F. The temperature of the vehicle-lubricant mixture should be sufficiently above the melting point of the mixture to prevent solidification of this mixture when added to the other ingredients which are at a lower temperature; but should not be so high as to cause gelation of these other ingredients. The molten mixture of vehicle and lubricant was then added to the premix paste prepared above and the entire composition placed in a high speed mixer. During this mixing the solution resin was added; and mixing was continued until all of this solution resin dissolved taking approximately 30 minutes. Sufficient frictional heat was generated during this last mixing operation to maintain the composition in a fluid state. Here also, care should be taken to avoid overheating of the composition during this final mixing to avoid gelation of the composition. Upon completion of this final mixing operation the composition was then poured into suitable containers and allowed to cool for subsequent use. During this cooling the composition froze and was thereafter handled as a solid.

Example 2

| Material: | Parts by weight |
|---|---|
| Preferred epoxidized polybutadiene 85% solution in xylol) | 23.5 |
| 1-allyloxy-2,4,6-trimethylol benzene | 3.0 |
| Vinly tris (2-methoxy-ethoxy) silane | 3.0 |
| TiO$_2$ | 20.0 |
| Polyvinyl chloride dispersion resin | 17.0 |
| Diphenyl | 70.0 |
| Polyethylene wax | 3.0 |
| Vinylite VAGH | 15.0 |

This composition has a melting range of about from 135 to 145° F.; and is used as a first-down white ink.

Example 3

| Material: | Parts by weight |
|---|---|
| Liquid 1,2-epoxide resin | 20.0 |
| 1-allyloxy-2,4,6-trimethylol benzene | 3.0 |
| Vinyl tris (2-methoxy-ethoxy) silane | 3.0 |
| TiO$_2$ | 20.0 |
| Polyvinyl chloride dispersion resin | 17.0 |
| Diphenyl | 108.0 |
| Polyethylene wax | 3.25 |
| Vinylite VAGH | 15.0 |

The above composition is another first-down white coating but has substituted therein for the epoxidized polybutadiene of Example 2 a liquid 1,2-epoxide resin formed from bisphenol and epichlorohydrin having a number average molecular weight of about 370 and an epoxide equivalent of around 200. A commercial material meeting these specifications is Epon 828. This composition has a melting range of about from 135 to 145° F.

Example 4

This composition is exactly the same as the composition set forth in Example 3 except that epoxidized soybean oil was substituted for the 1,2-epoxide resin in Example 3 and Vinylite VMCH was substituted for the VAGH in Example 3. This composition had a melting range of from about 135 to 145° F. and constitutes a first-down white ink.

Example 5

| Material: | Parts by weight |
|---|---|
| Liquid 1,2-epoxide resin | 10.0 |
| Polyester plasticizer (Rohm and Haas G–41) | 10.0 |
| Gamma-methacryloxypropyltrimethoxy silane | 3.0 |
| Fatty acid metal salt stabilizer | 1.0 |
| TiO$_2$ | 20.0 |
| Polyvinyl chloride dispersion resin | 17.0 |
| Diphenyl | 70.0 |
| Polyethylene wax | 3.0 |
| Vinylite VAGH | 15.0 |
| Solvesso 150 | 3.0 |

The small amount of Solvesso 150 disclosed adds additional fluidity to the composition. The 1,2-epoxide resin is the same as that used in Example 3. If desired, the amount of polyester plasticizer can be reduced to zero making a corresponding increase in the amount of 1,2-epoxide resin. This composition, as a first-down coating, has a melting range of about 135 to 145° F.

Example 6

| Material: | Parts by weight |
|---|---|
| Preferred epoxidized polybutadiene (85% solution in xylol) | 27.5 |
| 1-allyloxy-2,4,6-trimethylol benzene | 3.5 |
| Carbon black | 1.0 |
| Polyvinyl chloride dispersion resin | 17.0 |
| Acenaphthene | 70.0 |
| Polyethylene wax | 3.0 |
| Vinylite VAGD | 5.0 |

This composition is a first-down black ink having a melting range of about from 180 to 190° F. Using this composition with its substantially higher melting range permits using one of the previous inks as a second-down coating if desired.

Example 7

| Material: | Parts by weight |
|---|---|
| Preferred epoxidized polybutadiene (85% solution in xylol) | 23.5 |
| 1-allyloxy-2,4,6-trimethylol benzene | 3.0 |
| Vinyl tris (2-methoxy-ethoxy) silane | 3.0 |
| Chrome green | 2.4 |
| TiO$_2$ | 15.0 |
| Phthalocyanine blue | 17.0 |
| Polyvinyl chloride dispersion resin | 30.0 |
| Diphenyl | 30.0 |
| Vinylite VAGD | 15.0 |

This composition, having a melting range of about from 110° F. to 120° F., has utility as a second-down, blue ink.

Example 8

This example describes the application of a first-down white ink, i.e. Example 2, and a second-down blue ink, i.e. Example 7, over the white ink in rapid succession. The blue ink is applied in a different pattern from the white ink.

Pieces of the two solid inks are melted in separate suitable vessels, each to a temperature 5° to 10° F. above the upper limit of their respective melting ranges. As during the compounding of the composition, care should be taken to maintain the temperature thereof below about 225° F. to avoid gelation. The molten mixtures are then poured onto separate heated screens in a standard silk screen printing machine wherein each screen is maintained at about the temperature of the molten ink thereon. While on the heated screens the inks have a soft, melted-butter like consistency; and are thixotropic. The inks, first the white and within a second or so thereafter the blue over the white, are then screened onto the arcuate surface of a 12 oz. beverage bottle having a surface temperature of about 70° F. at a rate of sixty bottles per minutes. Depending upon the particular silk screen printing machine used, the inks may be applied at higher rates, e.g. 200 bottles per minute. Each ink sets or solidifies in a fraction of a second upon contacting the surface to which it was applied, and can be immediately printed over without offsetting or loss of definition. The bottle thus decorated is thereafter baked for about 10 minutes at about 400° F. during which time, in each ink film, the diphenyl remelts, refluidizing the composition, permitting sufficient flow-out to form smooth even films but still maintaining the definition of each print without sag or bleeding of one color into the other. Upon continued heating of the films during the baking operation, the now liquid diphenyl is volatilized and removed from the composition, as is the xylol; and the vinyl dispersion resin, the vinyl solution resin and the plasticizers therefor are fused so that at the end of the bake a blue pattern on a white background, each substantially diphenyl-free, remains on the bottle surface. Subsequent cooling of the now decorated bottle toughens the decoration and anchors it securely to the bottle.

The compositions of the instant invention have utility both as a first-down ink, i.e. the ink applied to the substrate first; and as a subsequent down ink, i.e. the ink applied second or third or fourth, etc. over or proximate to the previously down ink. The essential difference between first and subsequent down inks is that the first down ink has the highest melting range and the melting range of each subsequent down ink is lower than its predecessors. In other words, the second down ink has a lower melting range than the first down ink; the third down ink has a lower melting range than the first down ink; the third down ink has a lower melting range than the second down ink; and so forth. By this means, the subsequent down inks are applied at a lower temperature than their predecessors and therefore do not remelt the previously applied ink upon contacting it thereby obviating smearing or offsetting the previously applied ink.

The upper temperature of the melting range given for the inks set forth in the examples denotes the temperature at which the ink begins to solidify; and, at the lower temperature of the range given, the ink is substantially solid but still somewhat tacky. Therefore, for silk screen application of the inks, the screens are maintained about 5° to 10° F. above the supper limit of the range. The inks become non-tacky solids a few degrees, e.g. about 5° F., below the lower limit of the melting range. It will be noted that there is sufficient leeway between the melting ranges of proximate down inks so that the subsequent down ink does not remelt or appreciably soften its predecessor.

In general, melting range lowering is accomplished by increasing the relative amount of dissolved resin solids, i.e. plasticizer, stabilizer and vinyl solution resin, in the aromatic hydrocarbon vehicle. This is preferably done by decreasing the percentage of aromatic hydrocarbon vehicle from that used in a previous down ink. To maintain the application viscosity of the composition at an operable level, it is advantageous to reduce slightly the percentage of vinyl solution resin in the composition; or liquid organic solvent can be added to the composition to make up for all or part of the aromatic hydrocarbon vehicle reduction. For example, in the last down ink, the aromatic hydrocarbon vehicle can be omitted and the solvent-dispersant for the non-volatiles can be composed totally of a suitable, normally liquid organic solvent such as a mixture of xylol and lower alkyl ketone.

Although the aromatic hydrocarbon vehicles useful in the instant invention are crystalline solids having a sharp melting point, the instant compositions having resins dissolved and dispersed in the vehicle have no sharp melting point but rather have a melting range. However, the rate at which the compositions will solidify when applied to a relatively cold surface, such as the surface of a glass bottle at room temperature, is a function of the rate of solidification of the vehicle itself. Since a prime objective of the instant invention is to provide a cold set ink over which subsequent inks can be rapidly applied, the solidification rate of the composition is also of prime importance. All of the aromatic hydrocarbon vehicles set forth hereinbefore have the recited required properties; however, diphenyl is by far preferred because of the rapid solidification rate it imparts to the composition.

To provide the melting range for the inks, the first down ink contains about from 55 to 70% and preferably about 60% vehicle based on the weight of essential ingredients, i.e. vinyl solution resin, vinyl dispersion resin, plasticizer, stabilizer and vehicle. For each subsequent down ink, this amount of vehicle is reduced by about ¼ to ½ below the amount used in the immediately preceding ink until it becomes practicable to use all ordinarily liquid solvent-dispersants, i.e. the last down ink.

It is thought that the invention and many of its attendant advantages will be understood from the foregoing description and it will be apparent that various changes may be made in the matter of the ingredients, their identity, and their proportions without departing from the spirit and scope of the invention or sacrificing all of its material advantages, the form hereinbefore described being merely a preferred embodiment thereof.

I claim:
1. A homogeneous solid, fusible, cold-set coating composition comprising:
   an aromatic hydrocarbon vehicle having a melting point at atmospheric pressure in the range of 35° C. to 150° C. and a vapor pressure at 400° F. of at least 40 mm. of mercury;
   from 15 to 55% by weight, based on the weight of non-volatile resins present, of a vinyl chloride polymer dispersion resin containing more than 90° by weight of combined vinyl chloride and having a number average molecular weight substantially in excess of 10,000, said resin uniformly dispersed throughout said composition and being substantially insoluble in said vehicle when said vehicle is in a molten state;
   from 5 to 35% by weight, based on the weight of non-volatile resins present, of a vinyl chloride-vinyl acetate polymer solution resin having a number average molecular weight below 10,000; and
   as a plasticizer and heat stabilizer for said vinyl resins, an epoxide resin which is liquid at room temperature;
   each of said vinyl solution resin and said epoxide resin being substantially soluble in said vehicle when said vehicle is in a molten state.
2. The composition set forth in claim 1 wherein said vehicle is selected from the group consisting of diphenyl, 4,4'-dichlorodiphenyl, para dichlorobenzene, naphthalene, chlorinated -naphthalene, acenaphthylene and acenaphthene.
3. The composition set forth in claim 2 wherein said vehicle is diphenyl.
4. The composition set forth in claim 1 wherein said vinyl solution resin is a copolymer of vinyl chloride and vinyl acetate containing from about 87% to 91% by weight of vinyl chloride.
5. The composition set forth in claim 4 wherein said copolymer contains, by weight, about 91% vinyl chloride, about 3% vinyl acetate and about 6% vinyl alcohol.
6. The composition set forth in claim 1 wherein said epoxide resin is selected from the group consisting of a normally liquid, aromatic 1,2-epoxide resin, an epoxidized vegetable oil and an epoxidized polybutadiene.
7. The composition set forth in claim 6 wherein said epoxide resin is an epoxidized polybutadiene.
8. The composition set forth in claim 1 containing additionally a soluble and fusible, 1-alkenyl ether of a polymethylol phenol resin as an additional heat stabilizer for said vinyl resins.
9. A homogeneous solid, fusible, cold-set decorating ink composition comprising:
   diphenyl as an aromatic hydrocarbon vehicle;
   from 5 to 35% by weight, based on the weight of non-volatile resins present, of a normally insoluble, polyvinyl chloride dispersion resin having a number average molecular weight substantially in excess of 10,000 and containing greater than 90% by weight combined vinyl chloride, said resin being in swelled particulate form, uniformly dispersed throughout said composition;
   from 5 to 35% by weight, based on the weight of non-volatile resins present, of a vinyl chloride-vinyl acetate copolymer solution resin hydrolyzed so as to consist essentially of, by weight, about 91% vinyl chloride, about 3% vinyl acetate and about 6% vinyl alcohol and having a number average molecular weight below 10,000;

as a plasticizer and heat stabilizer for said vinyl resins, an epoxized polybutadiene resin containing from about 4 to 8% of oxirane oxygen; and an A-stage, 1-alkenyl polymethylol phenol as an additional heat stabilizer;

each of said polybutadiene resin and said phenol being at least in partial solid solution in said diphenyl, and said copolymer solution resin being at most in partial solid solution in said diphenyl.

References Cited

UNITED STATES PATENTS

| | | |
|---|---|---|
| 2,450,902 | 10/1948 | Marberge. |
| 3,142,687 | 7/1964 | Goldsmith et al. ____ 260—30.4 |
| 3,219,729 | 11/1965 | Meyers et al. _____ 260—33.6 |

FOREIGN PATENTS 815,301  6/1959  Great Britain.

ALLAN LIEBERMAN, *Primary Examiner.*

U.S. Cl. X.R.

260—33.6, 836, 837